UNITED STATES PATENT OFFICE.

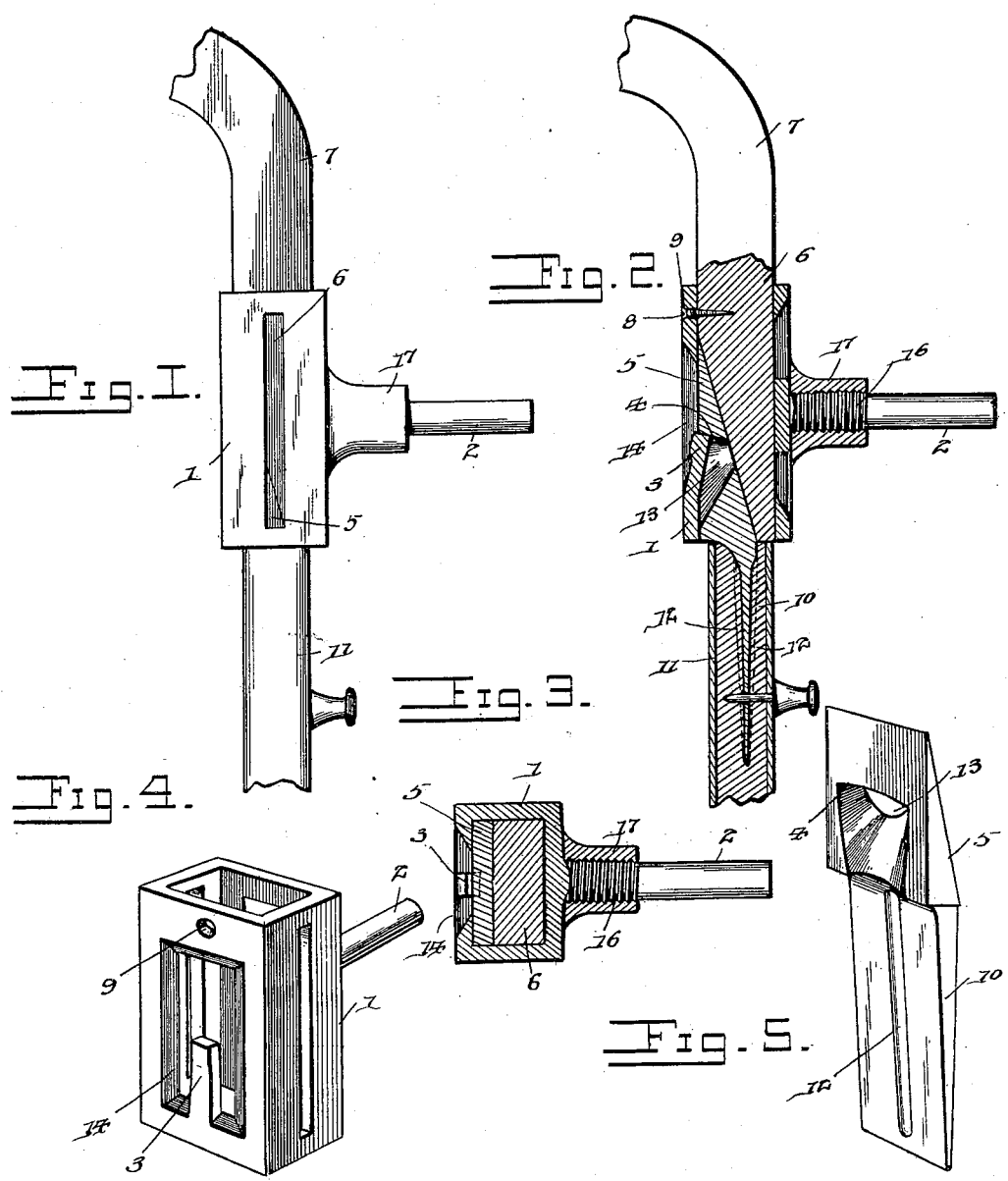

CHARLES E. HALL, OF RUSHVILLE, INDIANA, ASSIGNOR OF ONE-THIRD TO GEORGE F. WINDELER, OF SAME PLACE.

JOINT FOR VEHICLE-TOPS.

SPECIFICATION forming part of Letters Patent No. 648,026, dated April 24, 1900.

Application filed February 20, 1900. Serial No. 5,942. (No model.)

*To all whom it may concern:*

Be it known that I, CHARLES E. HALL, a citizen of the United States, residing at Rushville, in the county of Rush and State of Indiana, have invented a new and useful Joint for Vehicle-Tops, &c., of which the following is a specification.

The invention relates to improvements in joints for vehicle-tops and the like.

The object of the present invention is to improve the construction of joints and to provide a simple, inexpensive, and efficient one which, while capable of universal application, will be especially adapted for use on carriages and other vehicles, and which will permit a buggy-top to be readily connected with and detached from the props to enable it to be compactly arranged for crating and shipping and to facilitate repairing in event of the breakage of one of the bows.

The invention consists in the construction and novel combination and arrangement of parts hereinafter fully described, illustrated in the accompanying drawings, and pointed out in the claims hereto appended.

In the drawings, Figure 1 is an elevation of a joint constructed in accordance with this invention and shown applied to one end of a bow and the upper end of a prop. Fig. 2 is a vertical sectional view of the same. Fig. 3 is a horizontal sectional view. Fig. 4 is a detail perspective view of the socket. Fig. 5 is a similar view of the tapered or wedge-shaped tongue.

Like numerals of reference designate corresponding parts in all the figures of the drawings.

1 designates a rectangular socket open at both ends and provided at its outer side with a horizontal arm 2 and having a malleable lug 3 at its inner side to engage a shoulder 4 of a tapering arm or tongue 5. The socket 1 receives the adjacent end 6 of a bow 7, which is secured within the socket by a screw 8 or other suitable fastening device passing through a perforation 9 of the upper portion of the inner side of the socket and embedded in the bow 7, as clearly illustrated in Fig. 2 of the accompanying drawings. The ends 6 of the bow or other part to be connected or coupled are cut away at the inner side to provide a tapering or wedge-shaped portion, against which fits the tapered or wedge-shaped tongue or section 5, whereby a solid structure is provided and the parts are securely wedged together, so that there is no liability of any noise or rattling. The lower edge of the end 6 of the bow 7 is flush with the lower edge of the socket, and the tongue or member 5 is provided with a shank 10, designed to be embedded in the prop 11; but it may be secured in any other suitable manner to the other part to be connected or coupled. The socket constitutes one member of the coupling and is secured to one part, and the tongue or member 5, which forms the other section of the coupling, is secured to the other part, the two parts being connected by inserting the tongue or member 5 in the socket 1. The shank 10 of the tongue or member 5 is provided with a central reduced portion formed by opposite longitudinal grooves 12 to enable the shank or stem of a knob or button 12ª to be readily driven into the prop 11 without removing the said shank 12 and perforating it for this purpose. The prop 11, which is of the ordinary construction, consists of a steel tube and a wooden body or filling, as clearly illustrated in Fig. 2 of the accompanying drawings.

The shoulder 4 of the arm or member 5 is formed by a recess 13, located adjacent to the lug 3 when the parts are assembled and adapted to receive the said lug, as illustrated in Fig. 2, whereby the two sections or members are securely locked in engagement with each other. The lug 3 is located at an opening 14 of the inner side of the socket at the center of the lower portion of such opening, and spaces are provided at the sides of the lug to enable it to be readily engaged by a suitable tool for bending it outward when it is desired to uncouple the sections or members. The shoulder 4, when the joint is arranged in an upright position, is slightly inclined, as shown, to facilitate the engagement of the lug and to cause such engagement to result in wedging the parts, if possible, more closely together. The sides and front of the socket are provided with openings to lighten the construction; but the socket may be constructed to suit the character of the parts to which it is to be applied and the strain to which it is to be subjected, as will be readily understood, for the reason that the joint while being especially adapted for vehicle-tops is capable of universal application.

The arm 2, which extends from the outer side of the socket, is preferably cast integral therewith; but it may be rigidly secured to the same in any suitable manner, and it is adapted to receive the braces for holding the bows separated to maintain the top in its raised position. The inner portion of the arm is provided with screw-threads 16 to receive a threaded sleeve 17, and the outer end of the arm may be constructed for the reception of the ordinary bolt or any other suitable means may be employed for retaining the braces on it.

It will be seen that the joint is exceedingly simple and inexpensive in construction, that while it is shown applied to a vehicle-bow it is capable of universal application, and that its sections or members are tightly wedged together and effectually prevent any noise or rattling. It will also be seen that the lug, which is adapted to be bent into and out of engagement with the shoulder of the tongue, is easily operated and will not become accidentally disengaged through any jar or vibration. When the joint is applied to buggy-tops, it will enable them to be compactly arranged for crating and shipping, and that in event of the breakage of a bow it will greatly faciiltate the return of the same.

What is claimed is—

1. In a device of the class described the combination with two members, of a socket connected with one of the members and disposed longitudinally thereof, a tongue carried by the other member and fitting in the socket, and a lug carried by the socket and adapted to be bent into and out of engagement with the tongue, substantially as and for the purpose described.

2. A device of the class described comprising a socket open at both ends, a tapered member secured within the socket, a wedge-shaped tongue fitting within the socket and engaging the tapered member, and a lug carried by the socket and adapted to be bent into and out of engagement with the tongue, substantially as described.

3. A device of the class described comprising a member provided with a longitudinal socket, a second member provided with a longitudinal tongue fitting within the socket, one of the parts being provided with a shoulder, and a lug carried by the other part and adapted to be bent into and out of engagement with the shoulder, substantially as described.

4. A device of the class described comprising a socket open at both ends, a tapering tongue fitting within the socket, one of said parts being provided with a shoulder, a lug mounted on the other part and adapted to be bent into and out of engagement with the shoulder, and a tapered body or member secured within the socket and abutting against the tongue, substantially as and for the purpose described.

5. A device of the class described comprising a socket open at both ends, a tapered bow extending into the socket at one end thereof and fixed to the same, a tongue having a shank designed to be embedded in a prop, said tongue being tapered or wedge-shaped and fitting against the bow, and a lug for locking the tongue in the socket, said lug being mounted on one of the parts and engaging the other, substantially as described.

6. A device of the class described comprising a socket, a tongue fitting within the socket and provided with a recess forming a shoulder, said tongue being also provided with a shank adapted to be embedded in a member and a lug carried by the socket and engaging the shoulder and adapted to be bent into and out of such engagement, substantially as described.

7. In a device of the class described, the combination with a prop consisting of a tube and a body or filling, of a section or member having a shank embedded in the body or filling and provided with a reduced portion, whereby the shank of a button or knob may be driven through it, substantially as described.

8. In a device of the class described, the combination with a prop, of a section or member having a shank embedded in the prop and provided with opposite longitudinal grooves forming a reduced portion, and a knob or button provided with a shank arranged transversely of the top and driven through the reduced portion of the shank of the section or member, substantially as described.

In testimony that I claim the foregoing as my own I have hereto affixed my signature in the presence of two witnesses.

CHARLES E. HALL.

Witnesses:
 COREY C. LEMING,
 JESSE MEGEE.